Patented Apr. 20, 1954

2,675,914

UNITED STATES PATENT OFFICE 2,675,914

PACKAGING PRESSURE-SENSITIVE ADHESIVES

Warner Eustis, Newton, Mass., assignor to The Kendall Company, Boston, Mass., a corporation of Massachusetts No Drawing. Application April 8, 1953,
Serial No. 347,629

9 Claims. (Cl. 206—84)

This invention relates to packaging of pressure-sensitive adhesive tapes comprising polymerizable systems, this application being a continuation-in-part of my copending application Serial No. 214,444, which is a division of my once co-pending application now issued as Patent No. 2,572,458, which in turn was a continuation-in-part copending with my earlier filed application Serial No. 380,013, filed February 21, 1941, and now abandoned, which patent and applications, excepting Serial No. 214,444, were directed, at least in part, to pressure-sensitive adhesive tapes per se, as well as to the method of packaging the same, and the packaged tapes to which Serial No. 214,444 is directed and which are herein claimed.

One of the objects of this invention disclosed in said Patent No. 2,572,458 is the provision of an adhesive tape which carries a coating of a viscous tacky composition consisting essentially of polymeric styrene, the composition having characteristics such that it may be preserved over substantial periods of time in a soft, viscous, tacky, pressure-sensitive condition, preferably in a prepared container, until ready for use, at which time the tacky coated tape may be manipulated and applied to an external surface in the ordinary manner of masking or of surgeon's tape.

Another object of the invention, not confined to pressure-sensitive adhesive tapes consisting essentially of polymeric styrene, is the provision of other packaged tapes containing adhesives comprising polymerizable systems which, similarly to styrene, are coated on suitable backings and similarly converted into tapes which are suitably preserved in proper packaging and which, upon being removed from the package, may be applied to an external surface whereupon the adhesives further polymerize in a manner similar to partially polymerized polystyrene composition adhesives.

As described in said Patent No. 2,572,458, I have discovered that polystyrene adhesive may be prepared by partially polymerizing a quantity of monomeric styrene, and then dissolving the partially polymerized composition, which is at a predeterminedly controlled degree of polymerization, in a further quantity of styrene—either monomeric styrene or polymeric styrene at a lower degree of polymerization, or mixtures thereof—and which second quantity of styrene contains a styrene polymerization inhibitor or retarding agent. Such ingredients may be formulated so that the composition has suitable viscosity for spreading on a backing and so that further polymerization will be definitely controlled with the adhesive retaining sticky, tacky characteristics over substantial periods of time after spreading, by proper packaging, whereby, upon removal from the package, the coating will be fresh, soft and tacky, as is required for classification as a pressure-sensitive adhesive, and will remain so at room temperatures for a period sufficiently long to permit manipulation of the coated backing as a flexible pressure-sensitive adhesive tape with application in the customary manner to electrical or other parts, to which the tape will conform by reason of its flexibility.

After application, the tape may remain soft and tacky for a further period, depending upon the particular type and amount of inhibitor included. In the usual case, however, the polymerization retarding effect of the inhibitor will be overcome in the course of exposure to atmospheric oxygen and other environmental influences over a period of time with resulting gradual polymerization into a dry mass. Such final setting up of the adhesive to form in some cases a bond between the backing and the article to which the tape has been applied, may if desired be accelerated by application of heat and/or by the inclusion in the adhesive mass of oxygen catalysts, preferably those becoming active at elevated temperature.

I have further discovered that a whole group of polymerizable systems, of which styrene is only a part, may be utilized for making tapes, which tapes, though initially pressure-sensitive, eventually lose their pressure-sensitive character through polymerization. These tapes, which normally display various degrees of adhesive instability, may be preserved in their pressure-sensitive condition by means of proper packaging in the presence of stabilizers and inhibitors. Tapes comprising such polymerizable systems may, in addition to the partially polymerized polymer, contain resins, fillers and compounding agents in the nature of softening or tackifying agents, plasticizers, adhesive strength enhancers and reinforcing or diluting fillers, without departing from the scope of the invention.

In general, the polymerizable systems which are useful in the packaged pressure-sensitive adhesives of this invention comprise vinyl systems which proceed by free radical polymerization and which under normal atmospheric conditions continue to advance in polymerization at a too rapid rate to maintain usable pressure-sensitive qualities over normal shelf life periods, such polymerizable systems include polymers, copolymers and terpolymers of the following compounds:

(a) Aryl vinyl compounds, such as styrene, p-chloro styrene, p-methyl styrene, alpha-methyl-p-methyl styrene, and meta-chloro styrene; (b) heterocyclic vinyl compounds, such as vinyl pyridine, vinyl thiophene, vinyl carbazole and vinyl pyrolle; (c) alkyl divinyl compounds, such as butadiene, 2,3-dimethyl butadiene, 2-methyl butadiene, 2-chloro butadiene, and 2,4-dimethyl penta-1,3-diene; (d) alkyl vinyl compounds, such as copolymerized isobutylene; (e) vinyl esters, such as vinyl acetate; (f) acrylic compounds, such as methyl acrylate, ethyl acrylate, butyl acrylate, isobutyl acrylate; (g) derivatives of alpha, beta-unsaturated, alpha, beta-dicarboxylic acids (copolymers only), such as methyl maleate, ethyl maleate, butyl maleate, hexyl maleate, fumaric acid esters of alcohols which contain less than six carbon atoms, aconitic and itaconic esters of alcohols which contain less than six carbon atoms, and mono alkyl esters of alpha-beta unsaturated alpha-beta dicarboxylic acids; and (h) vinyl ethers, such as vinyl alkyl ethers from ethyl through butyl.

Resinous materials in general which are suitable and compatible with any of the polymerizable systems above described may be incorporated into the adhesives for the purpose of modifying tack and plasticity or promoting adhesive strength. Those which I prefer include rosin, hydrogenated rosin, disproportionated rosin, rosin esters, hydrogenated rosin esters, disproportionated rosin esters, polyterpenes, and alkyl substituted phenol-formaldehyde resins condensed in the presence of rosin and its derivatives.

Finely ground inert materials are generally suitable as reinforcing and diluting fillers and pigments, but I prefer pulverized hard polymeric material of the same general type as that used in the adhesive, or finely ground mica, ground silica, ground glass, alumina, hydrated magnesium, aluminum silicate, fine-particle silicon dioxide, whiting, ground limestone, precipitated calcium carbonate, barytes, lithopone, titanium dioxide, zinc oxide, or carbon black.

For some purposes, it may be desirable to add various plasticizers and softeners to obtain requisite characteristics in the tape, either in the pressure-sensitive or the fully polymerized condition. Where that is the case, I prefer to use high boiling petroleum fractions such as are used in rubber processing or the alkyd resins in general, but other compatible plasticizers and softeners may be utilized if desired.

As examples of typical preparations of adhesives of this invention, I set forth the following:

Example I

Seventy-two parts of styrene monomer are polymerized at 125° C. for a period of approximately 3 hours, then cooled as rapidly as possible and mixed with 22½ parts of styrene monomer. Since styrene monomer is unstable, the above operations may be advantageously conducted in a nitrogen atmosphere. This composition has a viscosity suitable for doctor spreading on any suitable sheet backing, for instance, of glass, polystyrene, polybutene or polyethylene. In order, however, to maintain stability, it is advantageous to incorporate in the mix .05% of a styrene polymerization inhibitor in the form of hydroquinone, or equivalent amounts of quinone, benzoquinone or phenanthraquinone.

The composition as applied will have soft, sticky, tacky characteristics and will be transparent.

Where the coating is to be thin, the spreading operation is also advantageously conducted in the absence of oxygen. Application of the coating may be to one or both sides of the backing, or by an impregnating operation, the supporting medium, if of the porous type like woven glass fabric, can be provided with a pressure-sensitive tacky adhesive on both sides. Whether the operation be one of coating or of impregnating, a thin continuous flexible film of the composition may be secured. In some cases volatile hydrocarbon solvents may be resorted to as thinners or diluents for the purpose of spreading the compositions on the backing.

Again ground or pulverized solid polymeric styrene or any one of the several hard varieties of polystyrene, finely ground mica, ground silica (quartz), ground glass, or combinations thereof may be included as inert fillers.

Since some partially polymerized adhesive systems, particularly styrene, polymerize eventually even in the dark and in the absence of heat and oxygen, certain precautions are required in packaging the tapes of this invention where storage over long periods prior to use is contemplated. While for some conditions it is sufficient to package the tape in an air-tight, light-tight container, under other conditions it is advantageous to reduce or eliminate atmospheric oxygen by evacuating partially, at least, air from the container, or to fill the container with a fluid such as a vapor or gas which is inert toward, i. e., will not positively catalyze, the polymerization, examples of gases being nitrogen, carbon dioxide, helium, argon, krypton, xenon and the chloro-fluoro methanes. Where qualities permitting storage for maximum time periods are required, instead of using a gas which merely is inactive so far as the polymerization reaction is concerned, it may be found desirable to introduce a gas of a type which of itself tends to inhibit polymerization. The gaseous hydrocarbons isobutane, butylene and propane are useful for this purpose, being mildly inhibitive. In either case the fluid is catalytically negative toward the polymerization.

Suitable gases more strongly inhibitive of polymerization of the adhesives of this invention include hydrogen sulfide, ammonia and nitrous oxide. Suitable vapors of volatile liquids which are strongly inhibitive include butyraldoxime, acetaldehyde, formaldehyde, glyoxal, n-alkyl mercaptans such as ethyl and propyl, concentrated aqueous ammonia and amines of the type represented by the formula:

where R is methyl or ethyl and $R_2$ and $R_3$ are methyl or hydrogen.

Example II

The following mixture:

| | Parts by weight |
|---|---|
| Butadiene | 70 |
| Styrene | 30 |
| Water | 180 |
| Disproportionated rosin soap | 5 |
| Potassium persulfate | 0.5 |
| Potassium chloride | 0.3 |
| Sodium alkyl naphthalene sulfonate | 2 |
| Mixed hexyl mercaptans | 0.05 |
| Mixed octyl mercaptans | 0.05 |
| Mixed tertiary mercaptans ($C_{12}$–$C_{14}$) | 0.05 | is emulsified in a suitable pressure vessel and heated for 3 hours at 120° F. Thereafter, the vessel is opened and the excess butadiene allowed to evaporate. To this latex, consisting of an abnormal mixture of mixed molecular weight polymers and unreacted styrene monomer, is added a blend of 5 parts styrene monomer and 1 part ethyl amine. The blend is then slowly stirred for several hours to allow the dispersed styrene and ethyl amine to diffuse into the polymer particles.

Such a dispersion which may be thickened by a suitable agent, such as carboxymethyl cellulose, is coated onto fibrous backing materials in the well-known manners. Following drying through an oven, the coated web is slit and rolled into tape form. To prevent further polymerization during storage, the tape roll is packaged in a hermetically sealed can containing additional polymerization inhibitor such as ethyl amine, or nitrogen.

When required for use, the tape is removed from the can, applied to the desired surface or object effectively by means of its pressure-sensitive character, and the ethyl amine allowed to evaporate under normal conditions or accelerated by slight heating. Thereafter the interrupted polymerization resumes through the action of residual catalyst and the effect of oxygen in the air to yield a non-pressure-sensitive, semi-solvent resistant, adhesive bonded structure.

Example III

A mixture of 50 parts ethyl acrylate and 50 parts of dibutyl maleate is dissolved in 250 parts of acetone. Following addition of 0.1 part of benzoyl peroxide, the mixture was refluxed for 15 minutes at which time 0.05 part of hydroquinone was added and the reaction mixture cooled rapidly to interrupt the polymerization. Following concentration, through partial in vacuo removal of the acetone, the viscous blend was ground on a paint mill with 5 parts carbon black, 5 parts ultra-fine particle size calcium carbonate and 5 parts of the glycerol ester of wood rosin (ester gum). To this was added a mixture of 5 parts butyl acrylate, 0.5 part of benzoyl peroxide and 0.5 parts of an inhibitor butyraldehyde oxime.

A woven web, comprised of cellulosic fibers, was impregnated and coated with the above mixture through dipping and subsequent removal of excess material by doctor-knife technique. The impregnated and coated web was carried through a drying chamber where residual solvent was removed. Following this operation, the pressure-sensitive adhesive coated web was adhered to an interliner, slit into tape and wound into rolls. The resultant tape rolls carrying an inhibited partially polymerized adhesive were packaged in hermetically sealed cans.

In use, the tape is removed from the can and applied to the desired surface. Following evaporation of the temporary inhibitor the system will resume polymerization upon completion of which a tack-free, rigid, highly reinforced bond, between the adhesive and the surface of application, results. Application of heat, through infrared heaters, chemical hot-packs, etc., may be used to accelerate the setting time if that is desired.

Example IV

Fifty (50) parts of allyl methacrylate are dissolved in two hundred (200) parts of chloroform and the whole heated at reflux for two hours in the presence of 1.0 parts of benzoyl peroxide. The resulting viscous solution of polymer is then coated onto a suitable woven web or other backing by a simple knife coater and the coated web slit into tape rolls of the desired width and length. Said rolls are then sealed in hermetically sealed cans under positive pressure of 100 mm. of hydrogen sulfide.

Following storage, the pressure-sensitive coated web may be applied to the surface to be covered whereupon the adhesive further polymerizes to a non-tacky, rigid, immobile, solvent and heat resistant structure which result may be accelerated by spraying with diethyl etherate of boron trifluoride.

Example V

A mixture of ninety-eight (98) parts of maleic anhydride and one hundred and seven (107) parts of diethylene glycol are heated with stirring in the presence of a trace of litharge under a blanket of carbon dioxide at 200° C. until the acid number is ten or less. Following cooling to 50° C., 73 parts of styrene monomer (in which .05 part of hydroquinone has been dissolved) are added. A woven web of glass fabric is then dip-coated with the mixture, slit into tape form and stored in a hermetically sealed can with methyl-ethyl amine.

In application, the tape is removed from the can, the methyl-ethyl amine evaporates and the tape is applied in the desired manner, after which polymerization will occur through action of the light and oxygen of the atmospheric environment. This polymerization may be greatly accelerated by quickly dipping the tape (just prior to use) in a solution of 20 parts styrene, 2 parts of benzoyl peroxide and 0.1 part cobalt naphthenate.

Example VI

A mixture of 100 parts butyl acrylate in 250 parts benzene is heated to reflux with stirring. To this boiling mixture is added 0.75 part of benzoyl peroxide. After reacting for 0.5 hour, an additional 0.75 part of benzoyl peroxide is added, and the reaction refluxed for an additional two hours. Following cooling to room temperature 0.3 part of butyraldehyde oxime is added. The mixture is then dip-coated onto a non-woven cellulosic web, slit into tape and stored in a hermetically sealed can.

In application, the tape is removed from the can, affixed in the desired location and polymerization is allowed to proceed through volatilization of the inhibitor and action of environmental heat and light.

Example VII

A mixture of 100 parts butyl acrylate in 250 parts of carbon tetrachloride is heated to reflux with stirring. At time intervals of 0.5 hour, 1.5 parts of benzoyl peroxide are added until a total of 6.0 parts catalyst have been used. After an additional two hours refluxing, the solution is concentrated by distilling off the bulk of the carbon tetrachloride while stirring.

100 parts of the inhibited polymer of Example VI are combined with 50 parts of the above concentrated polymer solution, and the resultant solution of high and low molecular weight polymers is dip-coated onto a cellulosic web and converted into tape.

The resultant tape can be stored and used as described in Example VI.

The particular properties of the adhesive masses, especially their viscosity and tack properties, may be established through suitable control of certain variables. Among these is the degree of preliminary polymerization which depends upon the temperature and duration and/or catalyst of the initial polymerization reaction. Again, where more than one molecular weight is involved, the viscosity and consistency of the mass may be controlled by varying the degree of polymerization of the polymer of lower degree of polymerization to be added, and by properly proportioning its amount or the amount of monomeric material or mixtures thereof which is to be added to the preliminarily polymerized portion. In some cases other suitable solvents may be resorted to as thinners or diluents for the purposes of spreading the compositions on the backing, or as carriers for the polymerization controlling agent or agents. For instance, ethylbenzene or benzene may be of value with styrene. On the other hand, the consistency may be modified in direction of greater viscosity by resorting to a vacuum distillation at low temperature of the initially partially polymerized batch, thereby removing a portion of the monomer which remains after the preliminary polymerization.

Also, the amount of inhibitor included should be based upon the length of time and conditions of storage contemplated for the finished tape.

At room temperatures, the adhesives of this invention in their pressure-sensitive state have viscosities running from $10^2$ to about $10^6$, and preferably from $10^4$ to $10^6$ poises. After application the adhesives normally will polymerize to solid state viscosities higher than $10^6$ poises.

As will be seen, the coated tapes of this invention having supporting backings either of glass, cloth, paper, or of other suitable sheet materials, fibrous or non-fibrous, find highly advantageous use in electrical work, for instance as wire insulation for making electrical joints, or for other insulating purposes where a tape with a high dielectric strength is required. In addition, such tapes, even aside from their electrical properties, have other highly desirable properties both before and after final polymerization, including high resistance to heat, acids, alkalies and solvents.

A further desirable use for the tapes of this invention is as a foundation backing or supporting medium for pressure-sensitive or other adhesive coatings of well-known types so that the coatings of this invention act either as priming coats or as repellent coatings or as both. Where it acts as a priming coat, the composition may be either in its pressure-sensitive or in its dry flexible state at or after application of the additional coating. In these uses the transparent character of some of the coatings of this invention permits their availability as backings in the formation of transparent tapes.

Having thus described my invention, what I claim is:

1. A packaged pressure-sensitive adhesive comprising a container having sealed therein a soft, tacky pressure-sensitive adhesive consisting essentially of a polymeric material normally advancing in polymerization and a fluid content which is inert toward polymerization of said material for preserving the pressure-sensitive qualities of the packaged adhesive.

2. A packaged pressure-sensitive adhesive comprising a container having sealed therein a soft, tacky pressure-sensitive adhesive consisting essentially of a polymeric material normally advancing in polymerization and a gaseous content which is inert toward polymerization of said material for preserving the pressure-sensitive qualities of the packaged adhesive.

3. A packaged pressure-sensitive adhesive comprising a container having sealed therein a soft, tacky pressure-sensitive adhesive consisting essentially of a polymeric material normally advancing in polymerization and a fluid content which inhibits polymerization of said material for preserving the pressure-sensitive qualities of the packaged adhesive.

4. A packaged pressure-sensitive adhesive comprising a container having sealed therein a soft, tacky pressure-sensitive adhesive consisting essentially of partially polymerized styrene at a predetermined incomplete and intermediate stage of polymerization, said container having therein a gaseous styrene polymerization retarding agent for maintaining the pressure-sensitive qualities of the packaged adhesive.

5. A packaged pressure-sensitive tape comprising a container having sealed therein a flexible backing bearing a coating of a soft, tacky pressure-sensitive adhesive consisting essentially of a polymeric material normally advancing in polymerization and a fluid content which is catalytically negative toward polymerization of said material for maintaining the pressure-sensitive qualities of the adhesive coating of the packaged tape.

6. A packaged pressure-sensitive tape as claimed in claim 5 wherein the fluid content includes an inhibitor to said normally advancing polymerization.

7. A packaged pressure-sensitive tape comprising a container having sealed therein a flexible backing bearing a coating of a soft, tacky pressure-sensitive adhesive consisting essentially of partially polymerized styrene at a predetermined incomplete and intermediate stage of polymerization, said container having therein a gaseous styrene polymerization retarding agent for maintaining the pressure-sensitive qualities of the adhesive coating of the packaged tape.

8. The method of purposefully providing a pressure-sensitive adhesive which will lose its pressure-sensitive adhesive qualities after useful application to an external surface, comprising formulating an adhesive having pressure-sensitive adhesive qualities and containing as an essential constituent a polymerizable vinyl material which normally advances in polymerization to harden said adhesive, and packaging said adhesive in a sealed container, the fluid content of which is inert towards polymerization of said material, to maintain the pressure-sensitive qualities of said adhesive pending use.

9. The method of purposefully providing a pressure-sensitive adhesive which will lose its pressure-sensitive adhesive qualities after useful application to an external surface, comprising formulating an adhesive having pressure-sensitive adhesive qualities and containing as an essential constituent a polymerizable vinyl material which normally advances in polymerizaton to harden said adhesive, and packaging said adhesive in a sealed container, the fluid content of which inhibits polymerization of said material, to maintain the pressure-sensitive qualities of said adhesive pending use.

No references cited.